United States Patent

Epple et al.

Patent Number: 5,179,759
Date of Patent: Jan. 19, 1993

[54] DRIVE MECHANISM WITH LOST MOTION PLAY FOR A WINDSHIELD WIPER DEVICE OF MOTOR VEHICLES

[75] Inventors: Anton Epple, Rottenburg; Hans Trube, Herrenberg; Martin Pfeiffer, Stuttgart, all of Fed. Rep. of Germany

[73] Assignee: Daimler-Benz Aktiengesellschaft, Fed. Rep. of Germany

[21] Appl. No.: 478,459

[22] Filed: Feb. 8, 1990

[30] Foreign Application Priority Data

Feb. 8, 1989 [DE] Fed. Rep. of Germany ....... 3903681

[51] Int. Cl.⁵ .............................................. B60S 1/06
[52] U.S. Cl. .................... 15/250.13; 74/405
[58] Field of Search ........... 15/250.30, 250.31, 250.13, 15/250.31, 250.34, 250 R, 250.21, 250.23; 74/405, 411, 519

[56] References Cited

U.S. PATENT DOCUMENTS

| | | | |
|---|---|---|---|
| 2,259,790 | 10/1941 | Auten | 15/250.30 |
| 2,713,178 | 7/1955 | Stocks | 15/250.3 |
| 3,012,266 | 12/1961 | Riester | 15/250.30 |
| 3,453,679 | 7/1969 | Thorlakson | 15/250.23 |
| 4,144,614 | 3/1979 | Barbee | 15/250.30 |
| 4,264,997 | 5/1981 | Kolb et al. | 15/250.34 |
| 4,765,018 | 8/1908 | Buchanan, Jr. | 15/250.13 |
| 4,878,398 | 11/1989 | Heinrich | 15/250.31 |

FOREIGN PATENT DOCUMENTS

| | | |
|---|---|---|
| 2117085 | 10/1971 | Fed. Rep. of Germany . |
| 2727454 | 12/1978 | Fed. Rep. of Germany . |
| 2820104 | 11/1979 | Fed. Rep. of Germany . |
| 0163046 | 7/1986 | Japan .................. 15/250.30 |
| 772971 | 4/1957 | United Kingdom ........... 15/250.23 |
| 875036 | 8/1961 | United Kingdom ........... 15/250.30 |
| 2029542 | 3/1980 | United Kingdom ........... 15/250.13 |

*Primary Examiner*—Harvey C. Hornsby
*Assistant Examiner*—Gary K. Graham
*Attorney, Agent, or Firm*—Evenson, Wands, Edwards, Lenahan & McKeown

[57] ABSTRACT

A drive mechanism for a motor vehicle windshield wiper device has a crank which is driven in a rotating manner and produces a pivoting movement of a windshield wiper via a drive rod. If the movement of the windshield wiper is obstructed by a snow wedge building up in the wiper socket, the drive mechanism provides for an obstruction evading movement of the drive rod in such a way that the crank can fully rotate unimpeded. In order to obtain a low loading of the drive rod and its joints in the event of obstruction of the windshield wiper and to obtain a uniform wiping zone in normal wiping operation, the novel drive mechanism for the drive rod is firmly coupled to the crank and a lost motion drive means is arranged on the wiper shaft.

6 Claims, 6 Drawing Sheets

DRIVE MECHANISM WITH LOST MOTION PLAY FOR A WINDSHIELD WIPER DEVICE OF MOTOR VEHICLES

BACKGROUND AND SUMMARY OF THE INVENTION

The invention relates to a drive mechanism for a motor vehicle windshield wiper device comprising a rotating crank arranged to rotate at least one wiper shaft, which accommodates a wiper arm of a windshield wiper and which is fixedly connected to at least one rocker arm. The rocker arm is connected to the crank via a drive rod wherein obstruction means are provided to allow evading movement of the drive rod in such a way that the crank can fully rotate unimpeded when the wiper is obstructed.

German Offenlegungsschrift 2,820,104 discloses a drive mechanism of this general type. There a wiper shaft has a windshield wiper rotationally fixed thereto and is connected to a rocker arm, which in turn is connected with a crank drive via a drive rod. In order to avoid obstruction of the windshield wiper in cases in which a snow wedge builds up (for example, in the wiper pocket of the windshield wiper), means are provided which enable the drive rod to pivot about a joint which connects the rocker and the drive rod, as a result of which, full rotation of the crank is made possible. A crank is rotationally fixed to the drive shaft and to a pivoted lever. One end of the pivoted lever is restrained by the crank through a spring element and its other end is guided along a curved slot recess which is provided on the crank. The pivoted lever is connected to the drive rod of the windshield wiper device. In the event of obstruction, the evading movement of the drive rod is produced by a fulcrum pin at the crank being swung inwards into the curved recess slot. As a result of this, the crank radius is reduced.

Another known drive mechanism which is used in single-arm wiper units, has a drive lever which is rotationally fixed to a wiper shaft and on which fulcrums are provided for articulated levers which are connected in the form of a crosslink to a drive rod. The drive rod is coupled to a rotating crank. A space-saving type of construction is obtained by a crosslink drive of this kind.

The object of the instant invention is to design a drive mechanism for a windshield wiper device of the above-mentioned general type in such a way that lower loading of the drive rod and its joints is obtained, even if the windshield wiper is obstructed by a snow wedge building up in the wiper pocket. Also the invention provides for a uniform wiping zone in normal wiping operations, despite forces occurring at the windshield wiper.

In a drive mechanism of the above-mentioned general type, this object is achieved by having the drive rod firmly coupled to the crank and the obstruction permitting means is arranged on the wiper shaft. The obstruction permitting means is so arranged as to allow an evading movement of the drive rod such that the joint connecting the crank to the drive rod is fixed relative to the crank and is guided on a constant crank radius. The design according to the invention ensures that forces occurring at the windshield wiper do not cause any change in the crank radius of the drive rod. In this way, when high torques can occur (especially in the case of large windshield wipers) and a uniform wiping movement is obtained in normal wiping operation, as a result of which an improvement in the cleaning capacity is achieved. A further advantage of placing the obstruction means on the wiper shaft is that when the windshield wiper is obstructed by a snow wedge building up in the wiper pocket, there is lower loading of the drive rod and its joints (in particular the rocker/drive-rod joint). It is also advantageous that a particularly space-saving arrangement is obtained with the drive mechanism according to the invention.

It is advantageous if the obstruction device consists of a first component, which is rotatably fixed on the wiper shaft and is connected to the drive rod and to a strap. A second component is rotatably fixed on the wiper shaft and has a slotted guide member for guiding the strap. By such an arrangement the obstruction compensation means consist essentially of four components, which results in a particularly simple construction. The strap is guided at its free end on the slotted guide which is provided on a second component rotationally fixed to the wiper shaft. The slotted guide is here designed such that in the event of obstruction by a snow wedge building up in the wiper pocket, the first component rotates relative to the second component. As a result, the drive rod is permitted to perform an evading movement and the crank is permitted to fully rotate.

A further development provides for a guide means which engages into a slotted guide to be provided on the strap. The guide means can be a roller.

In a further design, provision is made for a spring element which is restrained by the second component and which is coupled to the strap.

Provision can be made for the slotted guide to be provided with a catch recess in which the guide means can be detachably arrested. In the wiping position of the windshield wiper, in which the guide means of the strap engages into the catch recess, a particularly good connection of the first and second components relative to one another is thus obtained. In the event of obstruction, the guide means can come out of the catch recess and slide into another area of the slotted guide. This enables the first component to rotate relative to the second component.

The invention has the advantageous construction that allows for a two-arm wiper unit. Here the obstruction compensation device is arranged on a first wiper shaft with a second component and a rocker arm arranged on a second wiper shaft and the compensation device is connected to the second component via a connecting rod.

The slotted guide has a catch recess and a first guideway which makes possible an evading movement of the first component in a pivoting direction of the obstruction means for single wiper arms. The slotted guide has a catch recess, arranged centrally and with two guideways which make possible an evading movement of the first component into two pivoting directions to accommodate two wiper arms.

Another advantageous embodiment of the invention has two drive levers which are rotationally mounted on the wiper shaft to act as rocker arms. Each lever is connected to an articulated lever which in turn are connected in the form of a crosslink to the drive rod. The drive levers are restrained one against the other and have a recess into which a driving dog engages. The driving dog is connected to the wiper shaft such that the two drive levers are restrained with determinable play on the driving dog so that when movement of the windshield wiper is obstructed, an evading movement of the drive rod is made possible. It is desirable if the two drive levers are of the same type of design. The driving dog is arranged on a drive bushing which is rotatably fixed to the wiper shaft. The two drive levers are rotatably mounted on the drive bushing and are restrained at their recesses by the driving dog of the drive bushing.

In this latter embodiment, the two drive levers, rotationally connected on the wiper shaft, act as a rocker arm to which at least one articulated lever is coupled. The articulated levers are connected in the form of a crosslink to the drive rod. The drive levers are restrained against one another and each have one recess into which a driving dog, connected to the wiper shaft, engages. Here the two drive levers are restrained with determinable play on the driving dog such that, if the movement of the windshield wiper is obstructed, an evading movement of the drive rod is made possible. The articulated levers are arranged in the form of a crosslink to produce the pivoting movement in a pivoting direction of the windshield wiper. The recesses on the drive levers are dimensioned in such a way that full rotation of the crank in the event of obstruction is made possible. In this case, the position of the drive levers relative to one another is changed via one of the articulated levers. The size of the angle of rotation can be determined by the size of the recesses. The kinematics of the crosslink are designed such that the means respond only in the wiper pocket but not at the reduced wiping angle.

A further advantageous development of the invention provides for the two drive levers to be of the same type of design. The manufacturing costs of the novel drive mechanism are thereby reduced.

Another advantageous design provides for the driving dog to be arranged on a drive bush which is rotatably fixed to the wiper shaft.

It is also advantageous to have the driving dog and recesses hardened in their edge area.

Other objects, advantages and novel features of the present invention will become apparent from the following detailed description of the invention when considered in conjunction with the accompanying drawings.

DETAILED DESCRIPTION OF THE DRAWINGS

Figure 1:
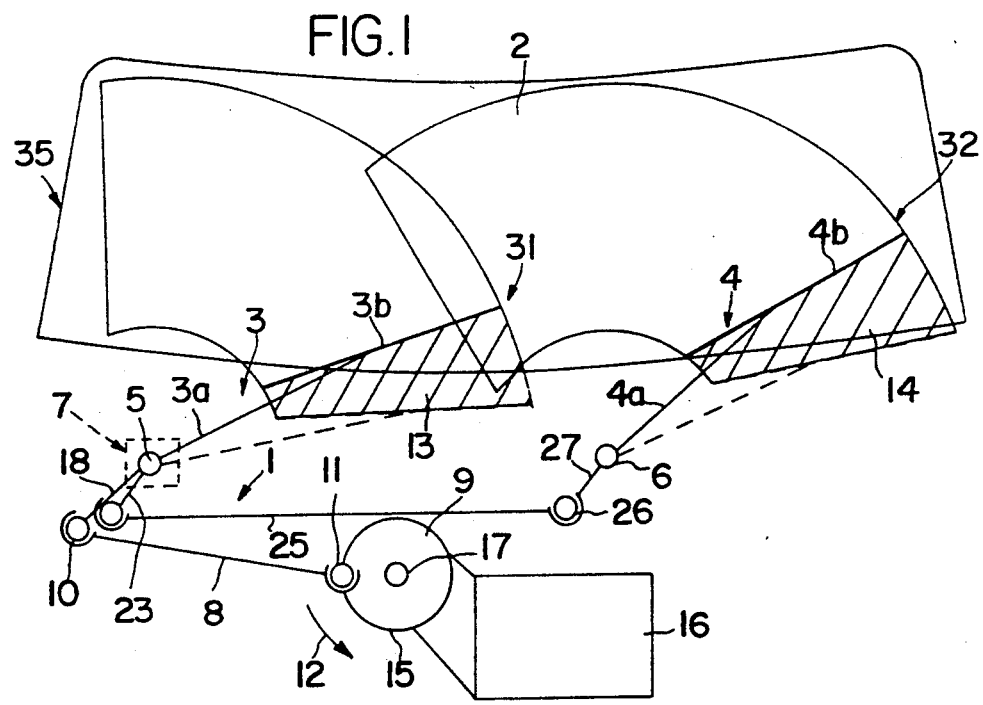
FIG. 1 shows a schematic representation of an embodiment of the invention for a two-arm wiper unit.

FIG. 1 schematically shows the drive mechanism 1 of a windshield wiper device which is provided for cleaning a windshield 2. The windshield wiper device is a two-arm wiper unit which has two windshield wipers 3 and 4. The windshield wipers 3 and 4 each have a wiper arm 3a, 4a and a wiper blade 3b, 4b. The wiper arms 3a, 4a are rotationally fixed on the wiper shafts 5 and 6. Drive means 7 is provided in the area of the wiper shaft 5 which, if the movement of the windshield wipers 3, 4 is obstructed, make possible an evading movement of the drive rod 8 in such a way that the crank 9 can fully rotate unimpeded. Obstruction of this type can occur during a snow fall if snow wedges 13, 14 build up in the wiper pocket arranged below the windshield 2. The drive means 7 act to reduce the wiping angle while the crank radius 15 of the joint 11 of the drive rod 8 at the crank 9 remains unchanged.

Figure 2:
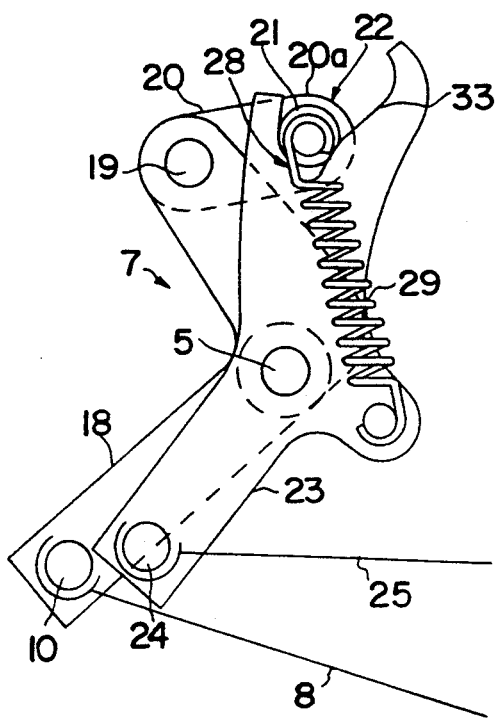
FIG. 2 shows the drive mechanism according to FIG. 1 in its position during normal wiping operation.
Figure 3:
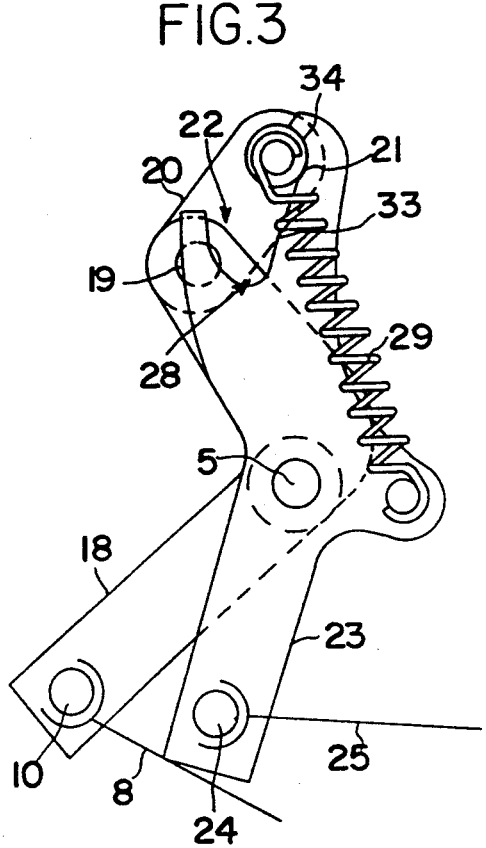
FIG. 3 shows the drive mechanism according to FIG. 1 in the obstructed position caused by a snow wedge building up in the wiper pocket.

For normal wiping operations, a drive unit 16 continuously drives the crank 9 via a drive shaft 17. The crank 9 rotates in the direction of the arrow 12. The joint 11 of the drive rod 8 is arranged on the crank 9 and consequently moves in a circular path. At its other end, the drive rod 8 is connected to a first component 18 of the drive means 7 by joint 10. The drive means 7 is arranged on the wiper shaft 5 in a rotationally movable manner. As can be seen in FIGS. 2 and 3, the first component 18 is of L-shaped configuration. A strap 20 is arranged on a fulcrum 19 of the first component 18 in such a way as to be rotationally movable. A guide means 21 is provided on the free end 20a of strap 20. The guide means 21, which can be a pin or a roller and engages into a slotted guide 22 which is provided on a second component 23. The second component 23 is rotationally fixed on the wiper shaft 5. A connecting rod 25 is coupled to a joint 24 of the second component 23 and to a rocker 27 of the second wiper shaft 6 via joint 26. The pivoting movement of the second wiper shaft 6 is produced via the connecting rod 25. The drive means 7 are provided in the area of the first wiper shaft 5.

In normal wiping operation, the drive means 7 are located in their normal position (FIG. 2). Here, the guide means 21 engages into a catch recess 28 which is provided on the slotted guide 22. The catch recess 28 is adapted to the shape of the guide means 21 in such a way that the latter is pressed into the catch recess 28 via a spring element 29. A reliable fixing of the position of the two components 18, 23 is thereby obtained. In this position, the drive means 7 of the drive mechanism 1, driven by the drive rod 8, performs a pivoting movement together with the wiper shaft 5. If the windshield wiper device is switched off, the windshield wipers 3, 4 are located in the wiper pocket so that the air resistance of the vehicle is reduced.

If snow wedges 13, 14 build up in the wiper pocket during a snowfall, the pivoting movement of the windshield wipers 3, 4 is obstructed by the top edge of the snow wedges 13, 14. The wiper blades 3b, 4b are then located in the positions 31, 32 (FIG. 1). Since the second component 23 is rotationally fixed to the drive shaft 5, it is likewise obstructed. The crank 9, continuing to rotate, swings the first component 18 via the drive rod 8 into a pivoted position shown in FIG. 3. The obstruction operation of the drive rod 8 is consequently obtained by rotation of the first component 18 relative to the second component 23. During this relative rotation, the guide means 21 comes out of the catch recess 28 of the slotted guide 22 and slides over the guideway 33 into a receptacle 34 provided on the slotted guide 22. The spring element 29 is thus stretched further out of its preloaded position. The design of the slotted guide 22 can be seen particularly well in this obstructing position of the strap 20. Only one guideway 33 is provided on the slotted guide 22 so that an obstruction movement of the blades 3b, 4b takes place only in the area of the wiper pocket and not in the area of the schematically indicated windshield A-column 35. In two-arm wiper units, a snow wedge building up in the area of the A-column 35 would result in a visual impediment for the vehicle driver.

Figure 4:
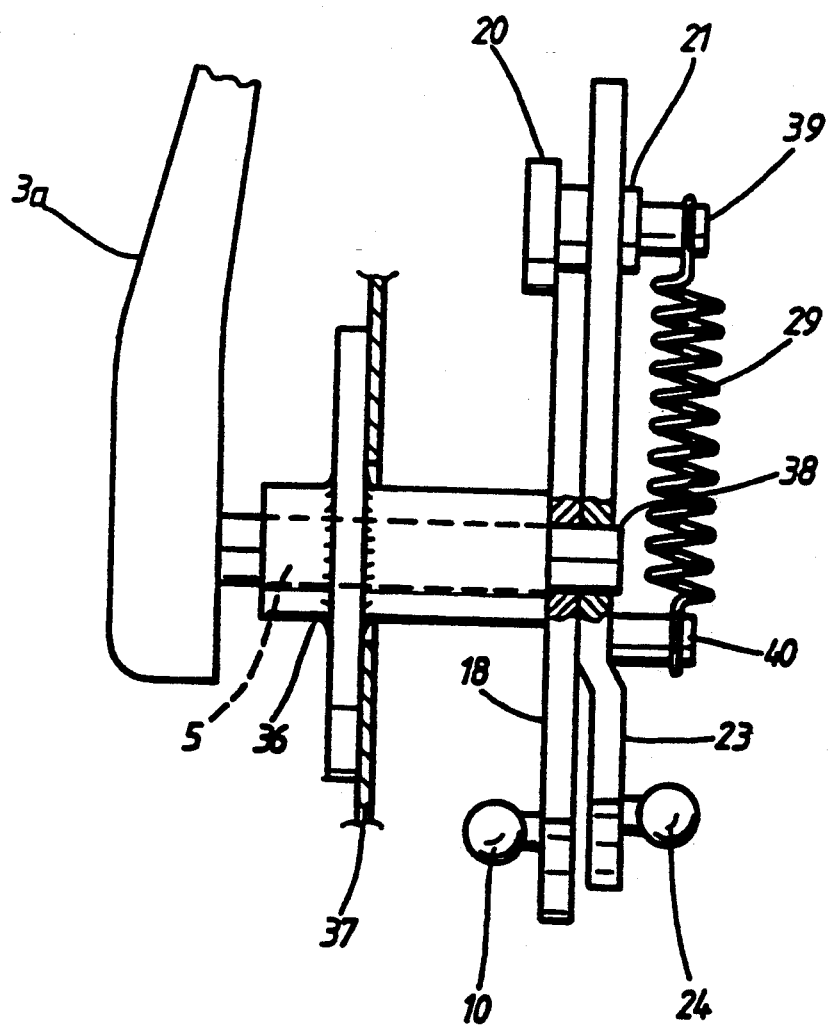
FIG. 4 shows a side view of the drive mechanism according to FIG. 1 in the area of the wiper shaft.

It is apparent from FIG. 4 that the wiper shaft 5 is arranged in a bushing 36 in such a way as to be rotationally movable. The bushing 36 is fixed to the vehicle body 37. The first component 18 is arranged on an end of the wiper shaft 5 between the bush 36 and the second component 23 in such a way as to be rotationally movable. The second component 23 is fixed to the wiper shaft 5 by means of a weld 38. Pins 39, 40 are provided for fixing the spring element 29.

Figure 5:
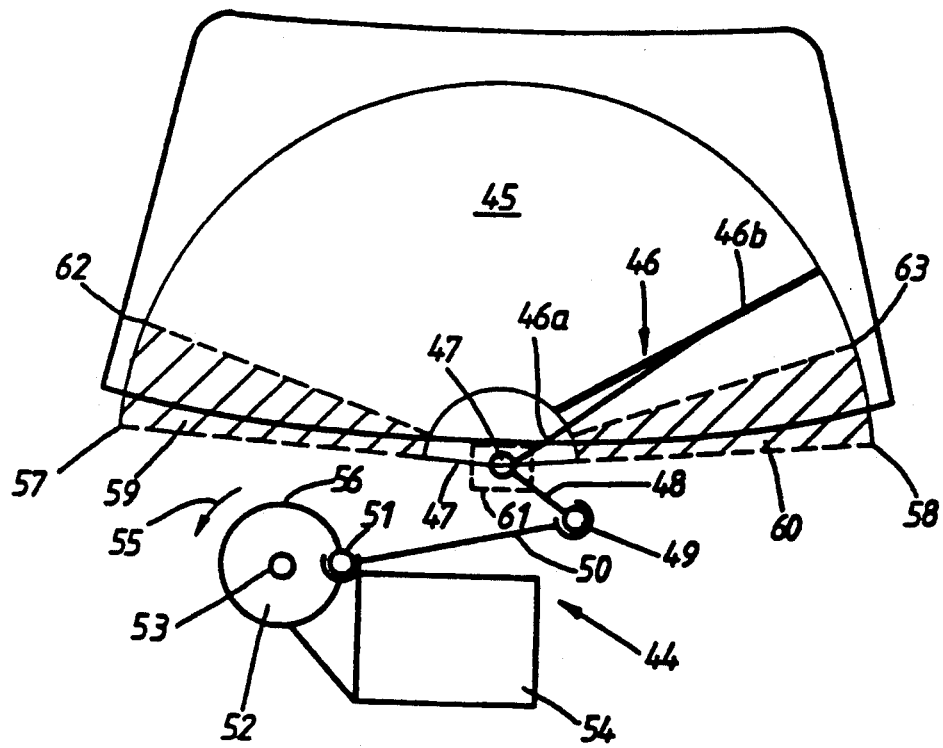
FIG. 5 shows another embodiment of the drive mechanism according to the invention for a single-arm wiping unit.

A further embodiment is shown in FIG. 5. Here the drive mechanism 44 is designed for a single-arm wiper device. A windshield wiper 46 is provided to clean a windshield 45 and has a wiper arm 46a and a wiper blade 46b. The wiper arm 46a is fixed on a wiper shaft 47 which is arranged in the wiper pocket arranged below the windshield 45. Provided on the wiper shaft 47 is a rocker 48 which is connected to a drive rod 50 at its fulcrum 49, The drive rod 50 is connected to a crank 52 at joint 51. The crank 52 sits on a drive shaft 53, which is driven by a drive unit 54. The crank 52 is rotatingly driven in the direction of the arrow 55. Thus the joint 51 of the drive rod 50 moves on a constant crank radius 56.

In normal wiping operation, the windshield wiper 46 performs a pivoting movement between the positions 57 and 58. When at rest, the windshield wiper 46 is located in the position 58 in the wiper pocket so that the air resistance of the vehicle is reduced.

If snow wedges 59, 60 build up in the wiper pocket during a snowfall, drive means 61 provided on the wiper shaft 47 produces an obstruction evading movement of the drive rod 50 in such a way that the crank 52 can fully rotate unimpeded. The wiping angle of the windshield wiper 46 is thereby reduced so that the windshield wiper 46 pivots between the positions 62, 63.

Figure 6:
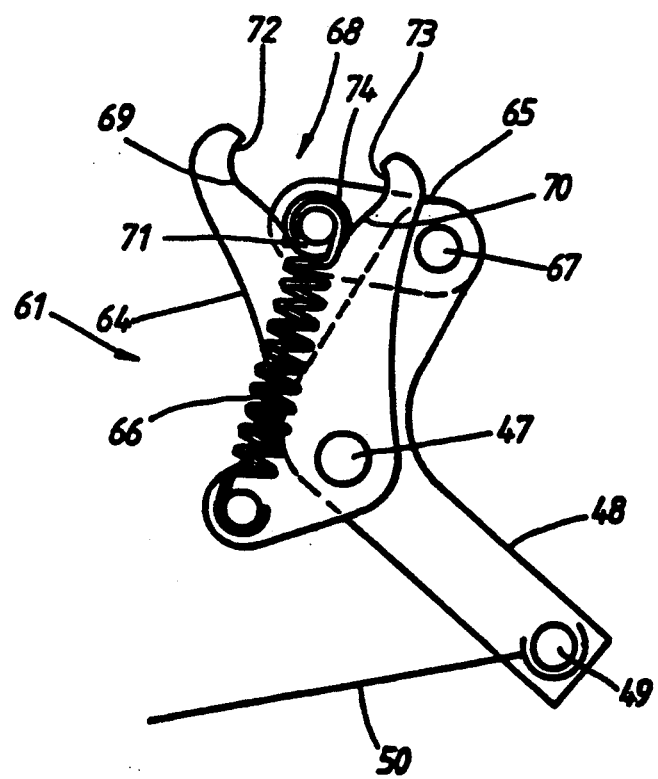
FIG. 6 shows the drive mechanism according to FIG. 5 in its normal position.

FIG. 6 shows the design of the drive means 6 in detail. The drive rod 50 is connected to a first component 48 of L-shaped design through joint 49. A strap 65 is rotationally mounted on the first component 48 via joint 67. The first component 48 is rotationally arranged on the wiper shaft 47. A second component 64 is rotationally fixed on the wiper shaft 47 and has a slotted guide 68 which is open at the top and is designed roughly as a V-shape. A guide means 74 is arranged on the strap 65 and engages into the slotted guide 68. In the normal position according to FIG. 6, the guide means 74, which can be a roller or a pin, is pressed in a catch recess 71 of the slotted guide 68 by means of a spring element 66. Reliable fixing of the position of the two components 48, 64 is thereby achieved.

In the event of obstruction, the guide means 74 can turn in two pivoting directions. To this end, guideways 69, 70 lead the guide means 74 into receptacles of the slotted guide 68. The rotation of the first component 48 relative to the second component 64 permits an obstructing evading movement of the drive rod 50 and full rotation of the crank 52.

Figure 7:
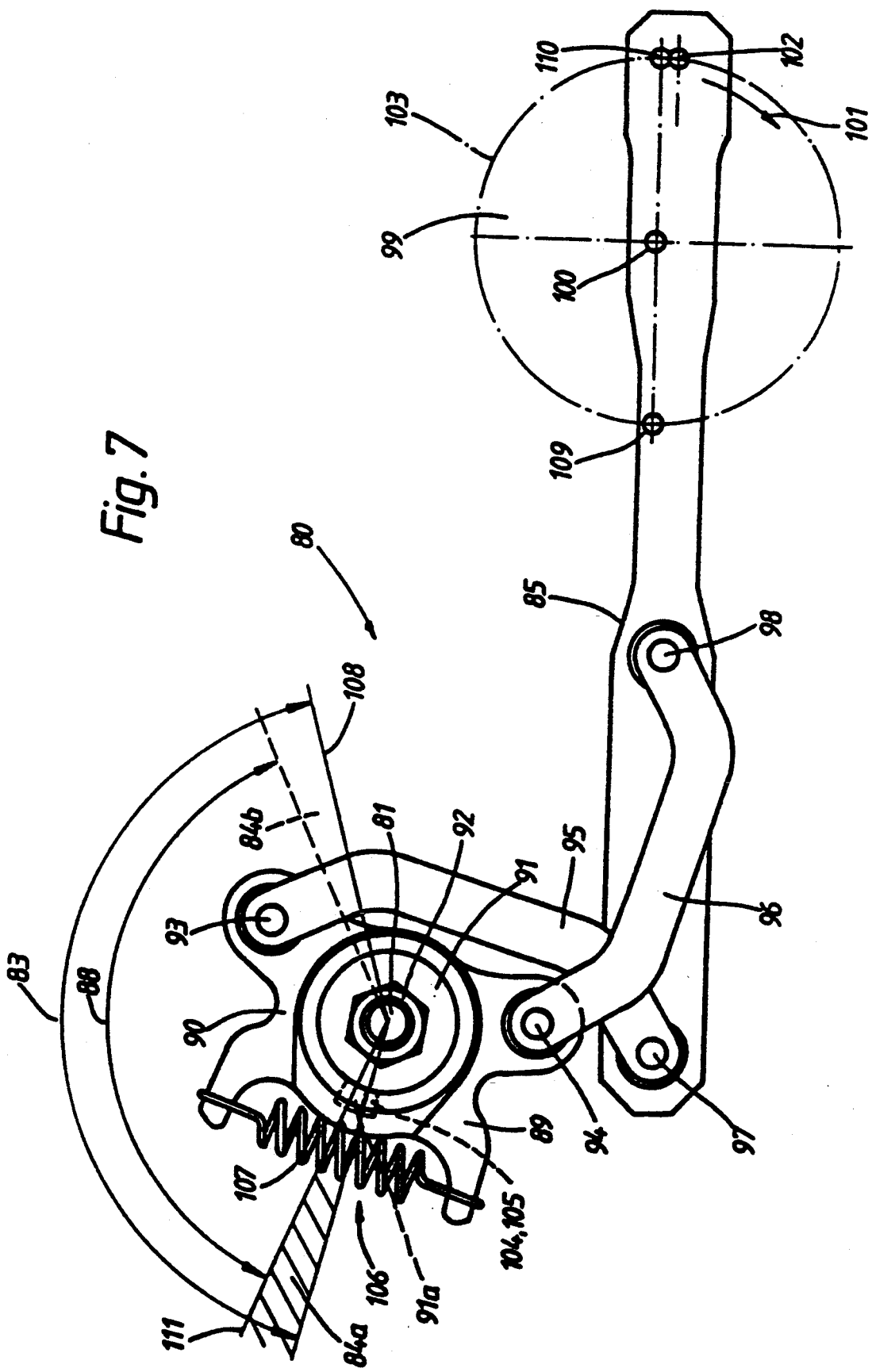
FIG. 7 shows a schematic representation of a further embodiment of the invention for a single-arm wiper unit.

FIG. 7 shows a schematic representation of a drive mechanism 80 for a single-arm wiper device. A wiper arm (not shown in the drawing) of a windshield wiper which is provided for cleaning a windshield is arranged on a wiper shaft 81. The wiper shaft 81 is arranged in a wiper pocket provided below the bottom edge of the windshield.

In normal wiping operation, the windshield wiper covers a large wiping angle 83. In the rest position of the windshield wiper device, the windshield wiper is located in a sunk position in the wiper pocket below the windshield. As a result, the air resistance on the motor vehicle is reduced. During a snowfall, snow wedges 84a, 84b can form in the wiper pocket. However, the drive mechanism 80 is designed in such a way that full rotation of a crank 99 connected to a drive rod 85 and fixed on a drive shaft 100 is made possible. To this end, drive means 106 provides an obstruction evading movement of the drive rod 85. If the windshield wiper is obstructed by the snow wedges 84a, 84b, the windshield wiper covers a small wiping angle 88.

The drive means 106 provided on the drive mechanism 80 are designed in such a way that they respond only in the area of the wiper pocket. This is achieved by the kinematics of the drive mechanism 80.

The drive mechanism 80 is composed of two drive levers 89, 90 of the same type which are arranged on a drive bushing 91 in such a way as to be movable in a sliding manner. The drive bushing 91 is fixed to the wiper shaft 81 by means of a screw 92. A joint 93, 94 is provided on each of the drive levers 89, 90 to couple the levers 89, 90 to articulated levers 95, 96. The articulated levers 95, 96 are rotationally connected to the drive rod 85 at joints 97, 98. The crosslink thereby formed has a particularly small space requirement. If the crank 99 is 101, the joint 102 which couples the drive rod 85 to the crank 99, moves on a constant crank radius 103. This produces an alternating pivoting movement of the driver levers 89, 90 which is transmitted to the wiper shaft 81 via a driving dog 91a provided on the drive bushing 91. To this end recesses 104, 105 are provided on the drive levers 89, 90 which are adapted to the size of the driving dog 91a and to the dimensions of the crosslink. The recesses 104, 105 are dimensioned in such a way that the crank 99 can fully rotate even with snow wedges 84a, 84b building up in the wiper pocket.

Figure 8:
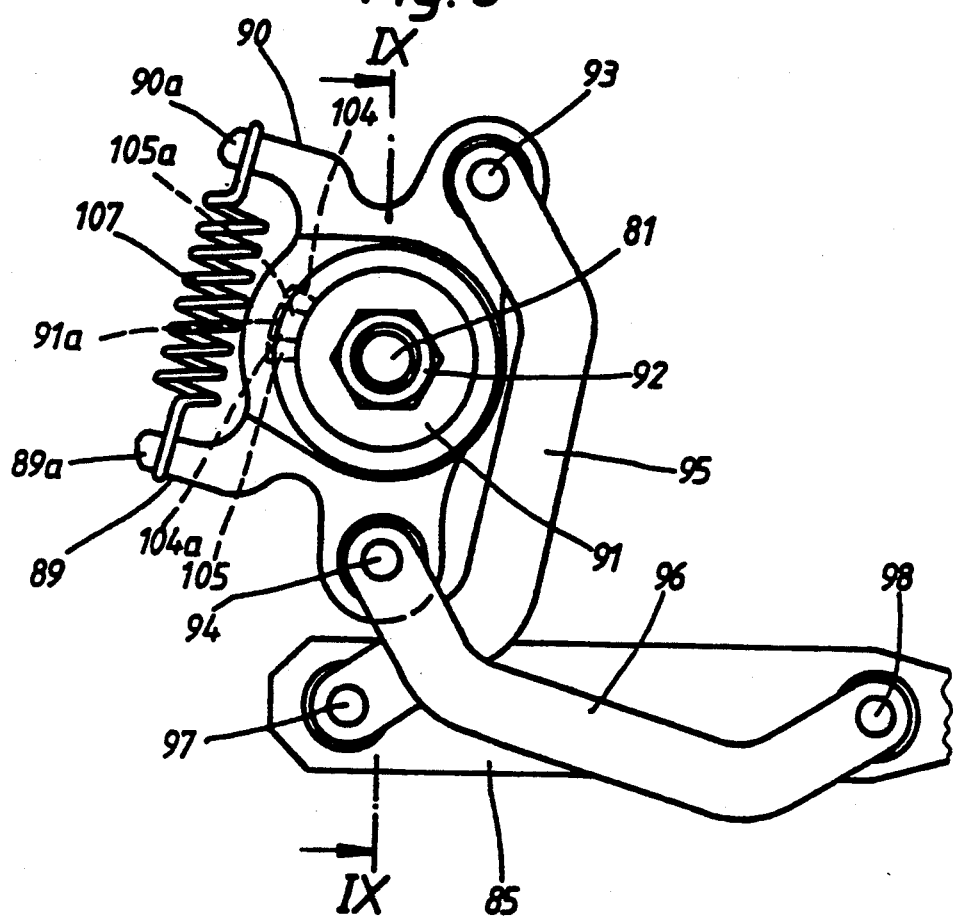
FIG. 8 shows an enlarged representation of the drive mechanism according to FIG. 7 in the area of the wiper shaft.

FIG. 8 shows the drive mechanism 80 in normal wiping operation with a large wiping angle 83. Here the drive means 89, 90, with their recesses 104, 105, are restrained on the driving dog 91a by means of a spring element 107. The spring element 107 is fixed in the area of the head ends 89a, 90a of the drive levers 89, 90. The restraining of the driving dog 91a of the drive bushing 91 is effected in such a way that the edge 104a of the recess 104 of the drive lever 89 bears against the driving dog 91a. The edge 105a of the recess 105 of the drive lever 90, arranged below the drawing plane, bears against the other side of the driving dog 91a. The drive levers 89, 90 are thus elastically restrained on the drive bush 91.

A pivoting counter clockwise movement of the windshield wiper from a parking position 108 is produced by means of a tensile force acting on the articulated lever 96. Here, the joint 102 moves in the direction of the arrow 101 from a position 109 to a position 110. If obstruction caused by a snow wedge 84a occurs at the windshield wiper in the area of the position 111, this does not result in any obstruction of the crank 99. The obstruction of the windshield wiper and the crank 99 continue to rotate to cause the first drive lever 89 to rotate relative to the second drive lever 90 so that the spring element 107 is stretched further. This relative rotation enables the drive rod 85 to perform an obstruction evading movement. The kinematics of the crosslink of the drive mechanism 80 are here designed in such a way that this relative rotation occurs only in the area of the wiper pocket.

Figure 9:
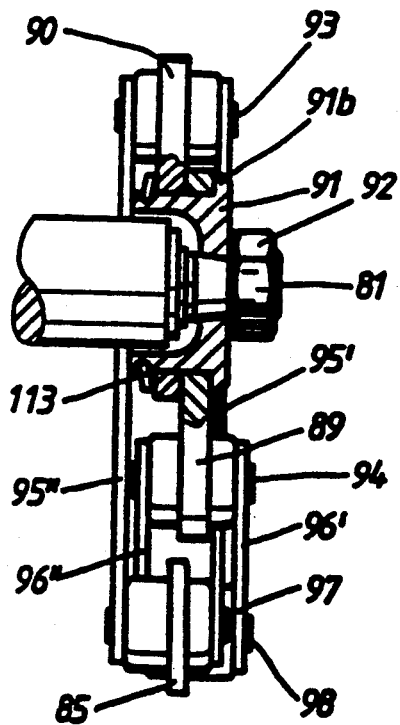
FIG. 9 shows the section along line IX—IX according to FIG. 8.

According to FIG. 9, the drive levers 89, 90 are arranged on the drive bushing 91 in a sliding manner, between a shoulder 91b of the drive bushing 91 and a retaining ring 113. FIG. 9 shows that the articulated levers 95, 96 are constructed in pairs with articulated lever pairs 95', 95'', 96', 96''.

Figure 10:
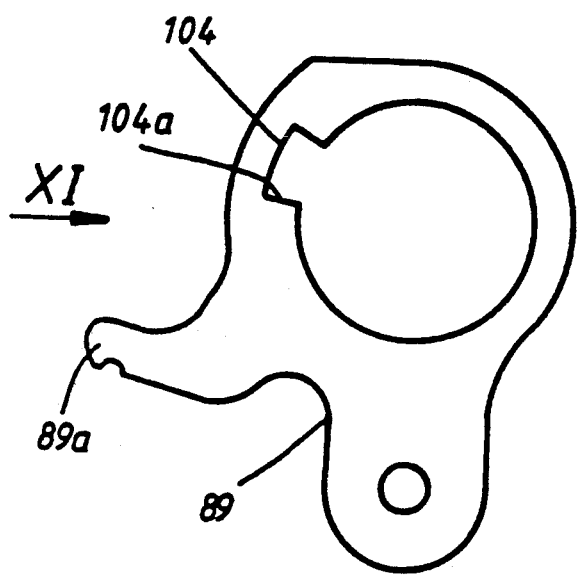
FIG. 10 shows a drive lever of the drive mechanism according to FIG. 7.
Figure 11:
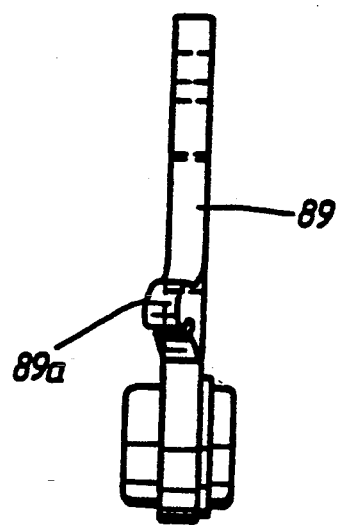
FIG. 11 shows a view in the direction of arrow XI according to FIG. 10.

FIGS. 10 and 11 show the first drive lever 89 in a detailed representation. The drive lever 89, just like the drive lever 90, is produced in a one piece stamping. FIG. 11 shows that the head part 89a of the drive lever 89 is arranged so as to be offset relative to the longitudinal axis of the drive lever 89. This improves the functioning of the spring element 107.

Figure 12:
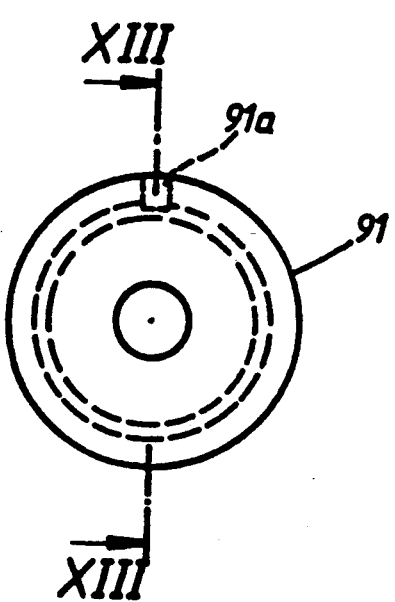
FIG. 12 shows a drive bush of the drive mechanism according to FIG. 7
Figure 13:
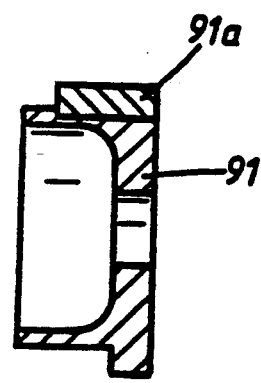
FIG. 13 shows the section along line XIII—XIII in FIG. 12.

The drive bushing 91 is shown in a separate representation in FIGS. 12 and 13. The driving dog 91a of the drive bush 91 has a surface-hardened finish to transmit high torque. In the same way, their recesses 104, 105 provided on the drive levers 89, 90 also have a hardened finish in the edge area. All species of the invention can use this surface-hardened finish.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Drive mechanism for a motor vehicle windshield wiper arrangement, comprising:
   a rotatable crank;
   at least one wiper shaft for mounting an associated windshield wiper arm;
   two articulated levers operatively connected with said wiper arm, said articulated levers forming a crosslink;
   a drive rod operatively connecting the articulated levers with the drank to which the drive rod is firmly coupled; and
   obstruction means operatively connected to the wiper shaft for allowing an unimpeded movement of the crank when the wiper arm is obstructed, the obstruction means including:
   a pair of drive levers, each operatively coupled to a separate one of said articulated levers, each of the drive levers being rotationally movable on the wiper shaft to act as rockers and
   a recess in each drive lever into which a driving dog operatively connected to the wiper shaft is adapted to engage, each said recess providing for a lost motion movement between respective drive levers and the driving dog;
   whereby restraint of one of the two drive levers provides a lost motion play with the driving dog such that if movement of the windshield wiper arm is obstructed, movement of the drive rod is still permitted, independently of the wiper speed and windshield wetting.

2. Drive mechanism according to claim 1, wherein the two drive levers have similar configurations.

3. Drive mechanism according to claim 1, wherein the driving dog is arranged on a drive bushing which is rotationally fixed to the wiper shaft.

4. Drive mechanism according to claim 3, wherein the two drive levers are rotatably mounted on the drive bushing and are restrained at their recesses by the driving dog of the drive bushing.

5. Drive mechanism according to claim 1, wherein the driving dog is hardened in its edge area.

6. Drive mechanism according to claim 1, wherein the recesses of the drive levers are hardened in edge areas.

* * * * *